(12) United States Patent
Nugyen et al.

(10) Patent No.: US 10,176,052 B2
(45) Date of Patent: Jan. 8, 2019

(54) SNAPSHOT BACKUP WITH UNIFIED RESTORE INFORMATION

(71) Applicant: International Business Machines Corporation, Armonk, NY (US)

(72) Inventors: Lu Nugyen, Tampa, FL (US); James P. Smith, Redwood City, CA (US); Christopher Zaremba, Endicott, NY (US)

(73) Assignee: International Business Machines Corporation, Armonk, NY (US)

( * ) Notice: Subject to any disclaimer, the term of this patent is extended or adjusted under 35 U.S.C. 154(b) by 88 days.

(21) Appl. No.: 15/495,711

(22) Filed: Apr. 24, 2017

(65) Prior Publication Data
US 2018/0307563 A1 Oct. 25, 2018

(51) Int. Cl.
*G06F 3/06* (2006.01)
*G06F 11/14* (2006.01)

(52) U.S. Cl.
CPC .......... *G06F 11/1451* (2013.01); *G06F 3/065* (2013.01); *G06F 3/067* (2013.01); *G06F 3/0619* (2013.01); *G06F 3/0665* (2013.01); *G06F 11/1435* (2013.01); *G06F 11/1464* (2013.01); *G06F 2201/84* (2013.01)

(58) Field of Classification Search
CPC ............ G06F 11/1451; G06F 11/1435; G06F 11/1464; G06F 3/065; G06F 3/0619; G06F 3/067; G06F 3/0665; G06F 2201/84
See application file for complete search history.

(56) References Cited

U.S. PATENT DOCUMENTS

| | | | |
|---|---|---|---|
| 6,721,767 B2 | 4/2004 | De Meno et al. | |
| 7,346,623 B2 | 3/2008 | Prahlad et al. | |
| 7,870,102 B2 | 1/2011 | Haustein et al. | |
| 9,418,149 B2 | 8/2016 | Amarendran | |
| 2015/0242482 A1 | 8/2015 | Sasson et al. | |

*Primary Examiner* — Hiep T Nguyen
(74) *Attorney, Agent, or Firm* — Kunzler, PC

(57) ABSTRACT

An apparatus, method and computer program product are disclosed. The apparatus includes a strategy module that determines restore information, writes the restore information into a restore information file, and writes the restore information file to a master volume containing target data; a snapshot module that creates a snapshot backup of the master volume; and a restoration module that restores the target data and restore information file, and restores application consistency of the target data. The method includes determining restore information, writing restore information to a file, writing the file to a volume containing data, backing up data by a snapshot backup of the volume, restoring data and the file, and restoring application consistency of the data. The computer program product comprises a computer readable storage medium that stores code to perform determining a backup strategy, backing up data, and restoring data.

20 Claims, 14 Drawing Sheets

SNAPSHOT BACKUP WITH UNIFIED RESTORE INFORMATION

FIELD

The subject matter disclosed herein relates to data backup and restore and more particularly relates to snapshot backups with unified restore information for data backup and restore.

BACKGROUND

Today's businesses operate in environments that include a variety of operating systems, applications and hypervisor programs. These businesses are increasingly using snapshot technology to backup active, online applications.

However, information about the backup type is stored on a backup server away from the data, and unless the restore client is previously aware of the type of backup and is programmed with corresponding actions, it cannot properly restore the data.

BRIEF SUMMARY

A method for snapshot backup with unified restore information is disclosed. An apparatus and computer program product also perform the functions of the method.

The apparatus comprises a strategy module that determines restore information based upon a backup type, writes the restore information into a restore information file, and writes the restore information file to a master volume containing target data; a snapshot module that creates a snapshot backup of the master volume; and a restoration module that restores the target data and the restore information file from the snapshot backup to a destination volume, and restores application consistency of the target data based on the restore information; wherein at least a portion of the information module, the backup module and the restoration module comprise one or more of hardware and executable code, the executable code stored on one or more computer readable storage media.

The method comprises determining a backup strategy, comprising determining restore information based on a backup type, writing the restore information into a restore information file, and writing the restore information file to a master volume containing target data; backing up data by creating a snapshot backup of the master volume; and restoring data, comprising restoring the target data and the restore information file from the snapshot backup to a destination volume, and restoring application consistency of the target data based on the restore information.

The computer program product comprises a computer readable storage medium that stores code executable by a processor, the executable code comprising code to perform determining a backup strategy, comprising determining restore information based on a backup type, and writing the restore information into a restore information file on a master volume containing target data; backing up data by creating a snapshot backup of the master volume, wherein the snapshot backup comprises the target data and the restore information file; and restoring data, comprising restoring the target data and the restore information file from the snapshot backup, and restoring application consistency of the target data based on the restore information.

BRIEF DESCRIPTION OF THE DRAWINGS

In order that the advantages of the embodiments of the embodiments will be readily understood, a more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which.

DETAILED DESCRIPTION

Figure 1:
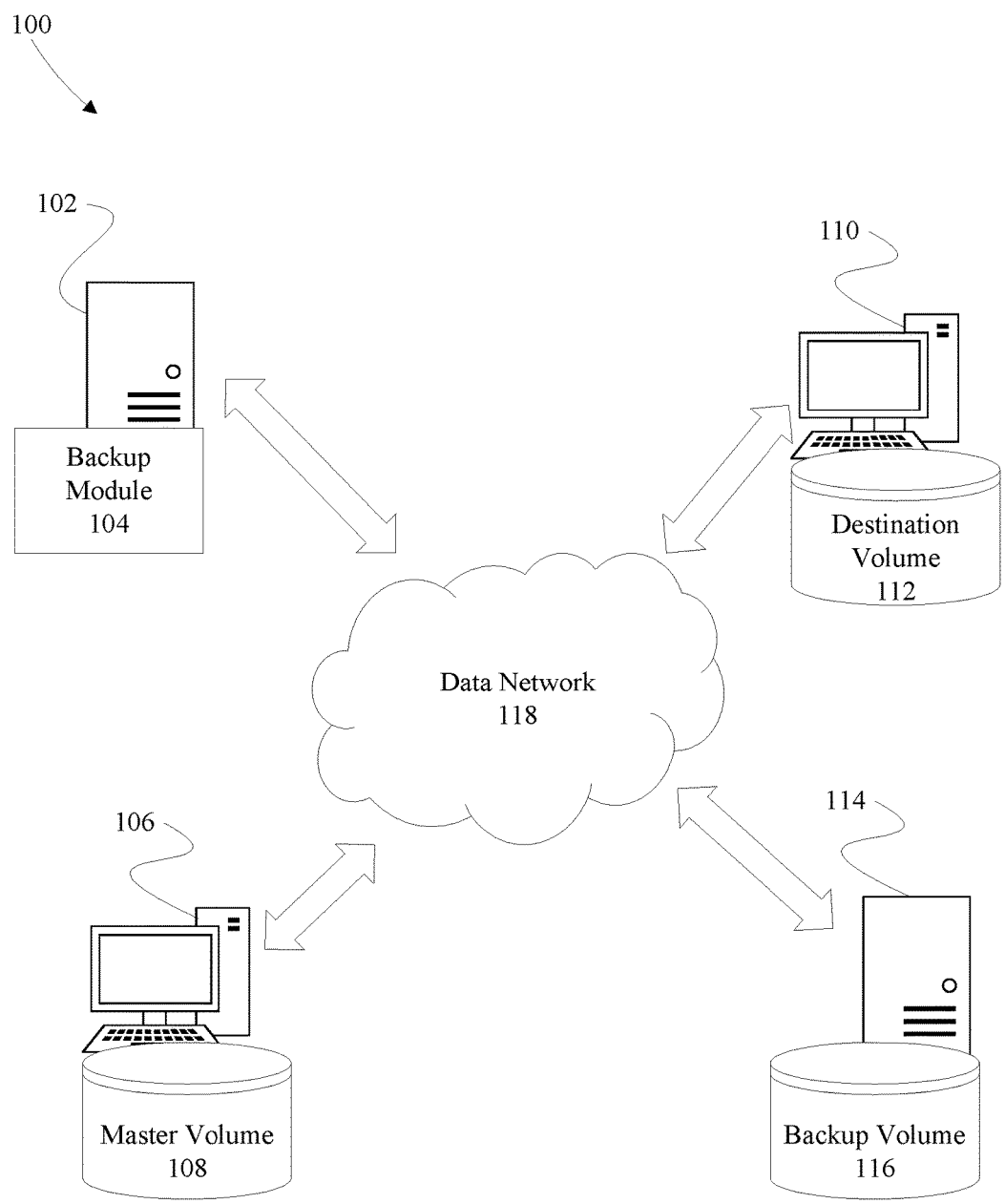
FIG. 1 is a schematic block diagram illustrating one embodiment of an apparatus for snapshot backup with unified restore information.

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to" unless expressly specified otherwise. An enumerated listing of items does not imply that any or all of the items are mutually exclusive and/or mutually inclusive, unless expressly specified otherwise. The terms "a," "an," and "the" also refer to "one or more" unless expressly specified otherwise.

Furthermore, the described features, advantages, and characteristics of the embodiments may be combined in any suitable manner. One skilled in the relevant art will recognize that the embodiments may be practiced without one or more of the specific features or advantages of a particular embodiment. In other instances, additional features and advantages may be recognized in certain embodiments that may not be present in all embodiments.

The present subject matter may be embodied in an apparatus, a method, and/or a computer program product. The computer program product may include a computer readable storage medium (or media) having computer readable program instructions thereon for causing a processor to carry out aspects of the embodiments.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory ("RAM"), a read-only memory ("ROM"), an erasable programmable read-only memory ("EPROM" or Flash memory), a static random access memory ("SRAM"), a portable compact disc read-only memory ("CD-ROM"), a digital versatile disk ("DVD"), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the embodiments may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the embodiments.

Aspects of the embodiments are described herein with reference to flowchart illustrations and/or block diagrams of methods, apparatus (systems), and computer program products. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of program instructions may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to" unless expressly specified otherwise. An enumerated listing of items does not imply that any or all of the items are mutually exclusive and/or mutually inclusive, unless expressly specified otherwise. The terms "a," "an," and "the" also refer to "one or more" unless expressly specified otherwise.

The schematic flowchart diagrams and/or schematic block diagrams in the Figures illustrate the architecture, functionality, and operation of possible implementations. It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Although various arrow types and line types may be employed in the flowchart and/or block diagrams, they are understood not to limit the scope of the corresponding embodiments. Indeed, some arrows or other connectors may be used to indicate only an exemplary logical flow of the depicted embodiment.

The description of elements in each figure may refer to elements of proceeding figures. Like numbers refer to like elements in all figures, including alternate embodiments of like elements.

FIG. 1 depicts one embodiment of an apparatus for snapshot backup with unified restore information. In some embodiments, the apparatus 100 comprises a backup module system 102 that runs a backup module 104. In some embodiments, the apparatus 100 comprises a master system 106 that comprises a master volume 108. In some embodiments, the apparatus 100 comprises a destination system 110 that comprises a destination volume 112. In some embodiments, the apparatus 100 additionally comprises a backup system 114 that comprises a backup volume 116. In some embodiments, the backup module system 102 is connected to the master system 106, the destination system 110 and the backup system 114 by a data network 118.

In different embodiments, the backup module system 102, the master system 106, the destination system 110 and the backup system 114 may comprise various types of computer systems, including a desktop computer, a laptop computer, a tablet computer, a mobile phone, a mainframe computer, a server, or other type of computer system. Different embodiments will comprise different combinations of computer systems for the backup module system 102, the master system 106, the destination system 110 and the backup system 114, and the examples described herein are exemplary in nature, rather than limiting or restricting.

Different embodiments of the apparatus 100 will comprise different combinations of the backup module system 102, the master system 106, the destination system 110 and the backup system 114. For example, some embodiments may include a backup module system 102, a master system 106 and a backup system 114, and the master system 106 may additionally serve as the destination system 110. In yet other embodiments, the apparatus 100 may include a backup module system 102 and a master system 106, and the master system 106 may additionally serve as the destination system 110 and the backup system 114. In other embodiments, the backup system 114 additionally serves as the master system 106.

Sometimes, in embodiments of the apparatus 100 that comprise different combinations of the backup module system 102, the master system 106, the destination system 110 and the backup system 114, one or more of these systems additionally serve the functions of one or more of the other systems listed. In such a case, the corresponding volumes may comprise various volumes coupled to the system additionally serving as another system, or a single volume may additionally serve as the corresponding volumes.

For example, in an embodiment that comprises a backup module system 102, a master system 106 and a backup system 114, wherein the master system 106 additionally serves as the destination system 110, the master volume 108 may serve as the destination volume 112. In other embodiments, the master volume 108 and the destination volume 112 may comprise separate volumes, but are both coupled to the master system 106. In other embodiments, the master system 106 may serve as the backup system 114. In some of these embodiments, the master volume 108 may additionally serve as the backup volume 116, while in other of these embodiments, the master volume 108 and the backup volume 116 may be separate volumes both coupled to the master system 106. Though not specifically mentioned herein, other combinations and arrangements of systems and volumes fall within the scope of this disclosure.

Some embodiments may comprise multiple master volumes 108, backup volumes 116 or destination volumes 112. For example, one embodiment may comprise a first master volume 108 and a second master volume 108, both coupled to the master system 106. Another embodiment may comprise a first destination volume 112 and a second destination volume, each coupled to the destination system 110. Various combinations are possible, and the embodiments are not limited to the specific configurations provided herein.

Some embodiments may comprise multiple master systems 106, backup systems 114 and destination systems 110. For example, one embodiment may comprise a first master system 106 and a second master system 106, with a first master volume 108 coupled to the first master system 106, and a second master volume 108 coupled to the second master system 106. Various combinations of multiple systems are possible, and the embodiments are not limited to the specific examples provided herein.

In some embodiments, the apparatus 100 comprises a data network 118. Depending on the individual embodiment, the data network 118 may comprise a local area network (or LAN), a wide area network (or WAN), the internet, another type of network, or a combination of any of these types of networks. In other embodiments, the data network may comprise internal routes of data communication within a single computer system. In some embodiments, the data network 118 may also comprise a combination of an external network and internal routes of data communication within a single computer system.

In some embodiments, the backup module system 102, the master system 106, the destination system 110 and the backup system 114 may all be combined into one system that performs the functions of the backup module system 102, the master system 106, the destination system 110 and the backup system 114. In such a case, the data network 118 comprises the internal routes of data communication within a single computer system (in this example, the backup module system 102).

Figure 2:
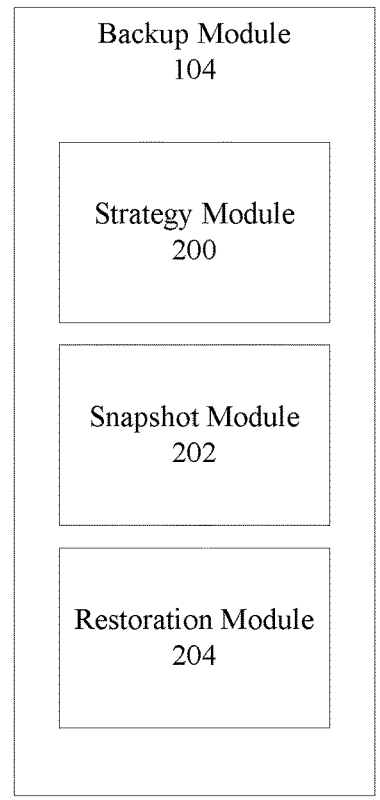
FIG. 2 is a schematic block diagram depicting the backup module of one embodiment of an apparatus for snapshot backup with unified restore information.

FIG. 2 depicts the backup module 104 of one embodiment of an apparatus for snapshot backup with unified restore information. In some embodiments, the backup module 104 comprises a strategy module 200, a snapshot module 202, and a restoration module 204. The functions of the strategy module 200, the snapshot module 202 and the restoration module 204 will be discussed herein.

Figure 3:
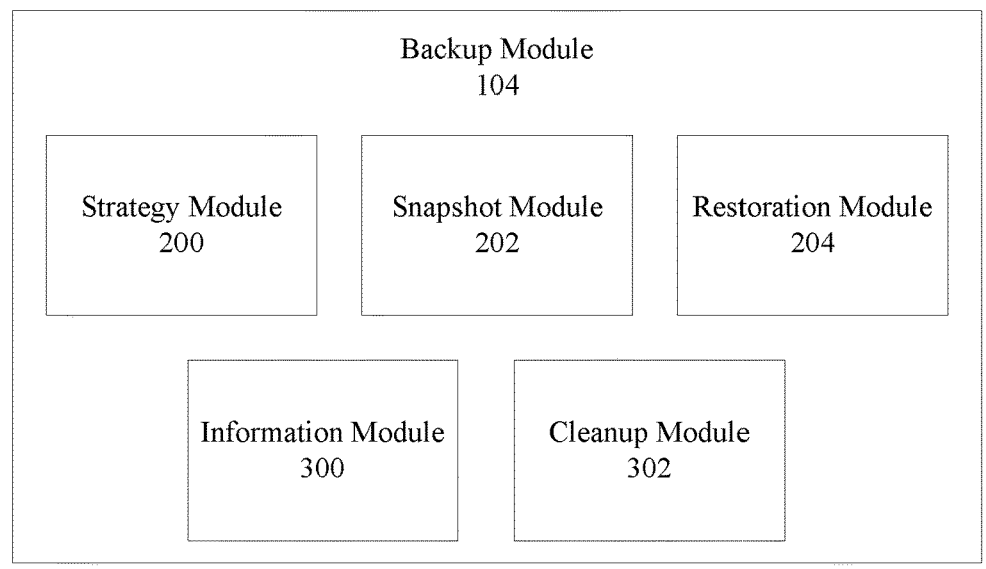
FIG. 3 is a schematic block diagram depicting the backup module of one embodiment of an apparatus for snapshot backup with unified restore information.

FIG. 3 depicts a diagram of the backup module of one embodiment of an apparatus 100 for snapshot backup with unified restore information. In some embodiments, the backup module 104 comprises the strategy module 200, the snapshot module 202 and the restoration module 204, as well as an information module 300 and a cleanup module 302. The functions of the information module 300 and the cleanup module 302 will be discussed herein.

In some embodiments, the strategy module 200, the snapshot module 202, the restoration module 204, the information module 300 and the cleanup module 302 may not all be placed on and run from the backup module system 102. One or more of the strategy module 200, the snapshot module 202, the restoration module 204, the information module 300 and the cleanup module 302 may be placed on a different system, such as the master system 106, destination system 110, backup system 114 or other system. For example, in one embodiment, the strategy module 200, the information module 300 and the snapshot module 202 may be placed on and run from the master system 106, the restoration module 204 may be placed on and run from the backup system 114. Various combinations are possible, and the embodiments are not limited to the specific situations mentioned herein.

In some embodiments, one or more of the backup module 104, the strategy module 200, the snapshot module 202, the restoration module 204, the information module 300 and the cleanup module 302 may be duplicated. In other words, some embodiments may have two or more of each of the backup module 104, the strategy module 200, the snapshot module 202, the restoration module 204, the information module 300 and the cleanup module 302. For example, in one embodiment, the apparatus 100 may comprise a first cleanup module 302 and a second cleanup module 302, wherein the first cleanup module 302 is assigned to a first volume, and the second cleanup module is assigned to a second volume.

In some embodiments, one or more of the backup module 104, the strategy module 200, the snapshot module 202, the restoration module 204, the information module 300 and the cleanup module 302 may be duplicated, and one or more of those modules may be placed on and run from a system other than the backup module system 102. For example, one embodiment may comprise two restoration modules 204, one each placed on and run from a first backup system 114 and a second backup system 114, to facilitate restoration of two backups or two portions of a single backup from both the first and second backup volumes 116. In another example, the apparatus 100 comprises a first cleanup module 302 placed on and run from the master system 106, and a second cleanup module 302 placed on and run from the destination system 110, wherein the first cleanup module 302 performs cleanup operations on the master volume 108 that is coupled to the master system 106, and the second cleanup module 302 performs cleanup operation on the destination volume 112 that is coupled to the destination system 110.

Figure 4:
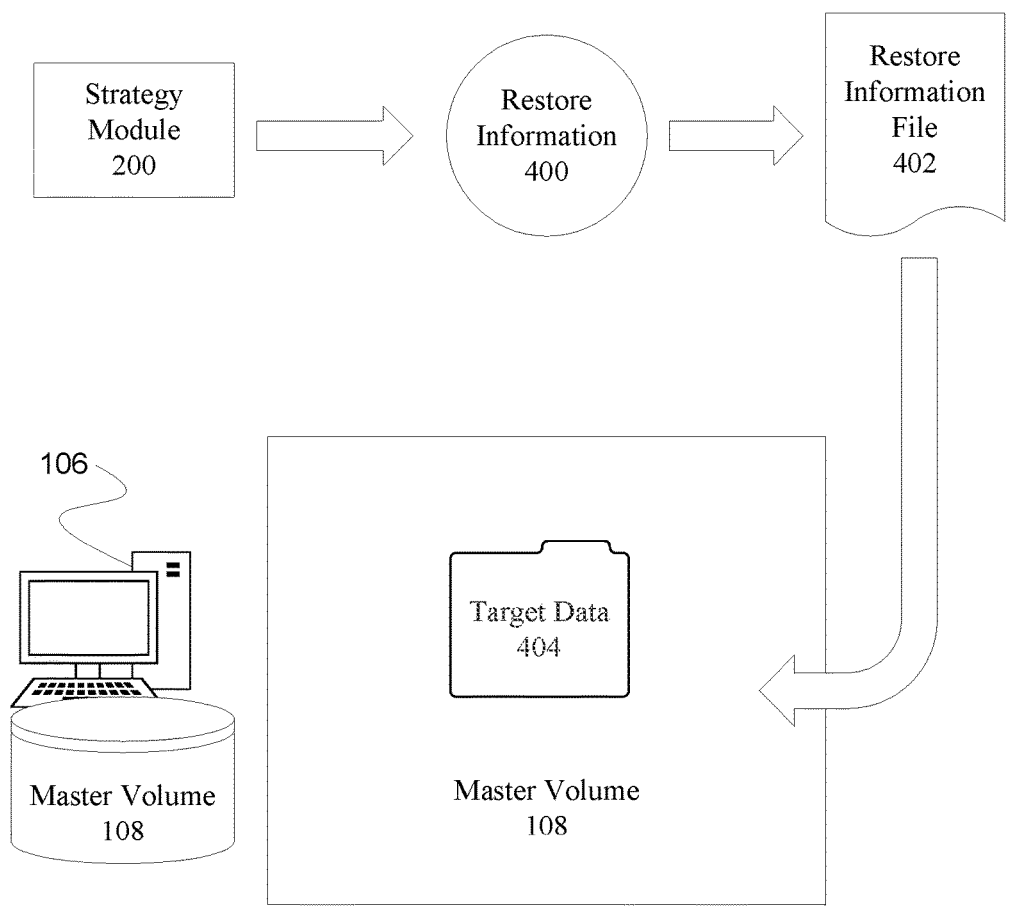
FIG. 4 is a schematic block diagram depicting some functions of the strategy module in one embodiment of an apparatus for snapshot backup with unified restore information.

FIG. 4 depicts some functions of the strategy module 200 in one embodiment of an apparatus 100 for snapshot backup with unified restore information.

In some embodiments, the strategy module determines restore information 400 based on a backup type. Possible backup types to be used in the various embodiments include entire virtual machine backups, individual database backups, hardware snapshot backups, software snapshot backups, online backup mode backups, frozen application backups, and other types of backup. Possible backup types used by the strategy module 200 and the apparatus 100 are not limited to those specifically mentioned herein.

In some embodiments, the apparatus 100 only uses one type of backup. In other embodiments, the apparatus 100 uses various types of backups in different situations. In cases in which various types of backup are used, the restore information 400 created varies, as there are different requirements that the restore information 400 must meet for the apparatus 100 to function correctly. These requirements differ based on the backup type used.

In some embodiments, the strategy module 200 also places the restore information 400 into a restore information file 402. The restore information file 402 is written to the master volume 108, which contains the target data 404.

The restore information file 402 contains and packages the restore information 400 that the apparatus 100 will use to properly restore the target data 404. Depending on the backup type used, the specific contents of the restore information 400, and thereby the contents of the restore information file 402, will vary.

In some embodiments, the target data 404 comprises data that is to be backed up using the apparatus 100. It is initially created by other programs or user and is initially stored on the master volume 108 of the master system 106. The target data 404 may comprise database information, audio/visual media, spreadsheets, text files, word processing files or any other type of data or combination of data used in the art. The target data 404 is not limited to the specific types of data mentioned herein.

Figure 5:
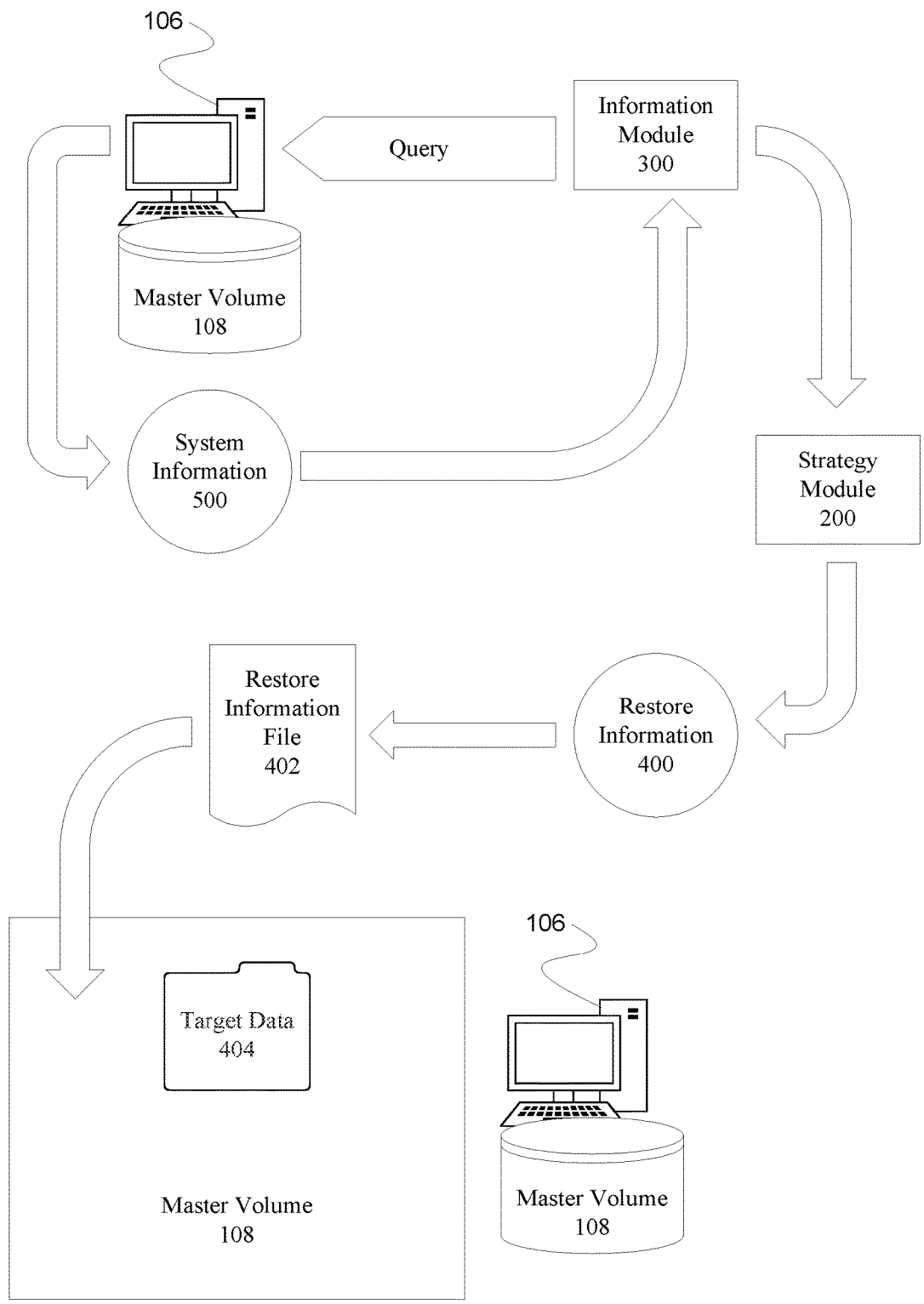
FIG. 5 is a schematic block diagram depicting some functions of the strategy module and the information module of one embodiment of an apparatus for snapshot backup with unified restore information.

FIG. 5 depicts some functions of the strategy module 200 and the information module 300 of one embodiment of the apparatus 100 for snapshot backup with unified restore information.

In some embodiments, the information module 300 queries the master system 106 for system information 500. In some embodiments, the system information 500 comprises information about the system to which the master volume 108 is coupled (in this example, the master system 106). The system information 500 comprises information about the system, such as information regarding the types of applications run on the master system 106, the operating system used on the master system 106 and hypervisor software run on the master system 106, as well as other information regarding the master system 106. The possible types of information gathered are not limited to those specifically listed herein.

In some embodiments, the information module 300 receives the system information 500 from the master system 106 as a result of the query. The information module 300 then sends the system information 500 to the strategy module 200. After receiving the system information 500, the strategy module 200 determines the ideal backup type based upon the system information 500. As explained herein, certain backup types are better suited to certain situations, and the system information 500 provides the necessary context for the strategy module 200 to determine the optimal backup type.

In some embodiments, the strategy module 200 determines the optimal backup type based on the system information 500 received from the information module 300. In some embodiments, the strategy module 200 then determines restore information 400 based upon the determined backup type, places the restore information 400 into the restore information file 402, and writes the restore information file 402 to the master volume 108 alongside the target data 404.

As today's technology environments include a variety of operating systems, applications and hypervisor technologies, gathering system information to determine optimal types of backup becomes increasingly important for flexibility and compatibility in data backup situations. Embodiments including the information module 300 address this problem.

Figure 6:
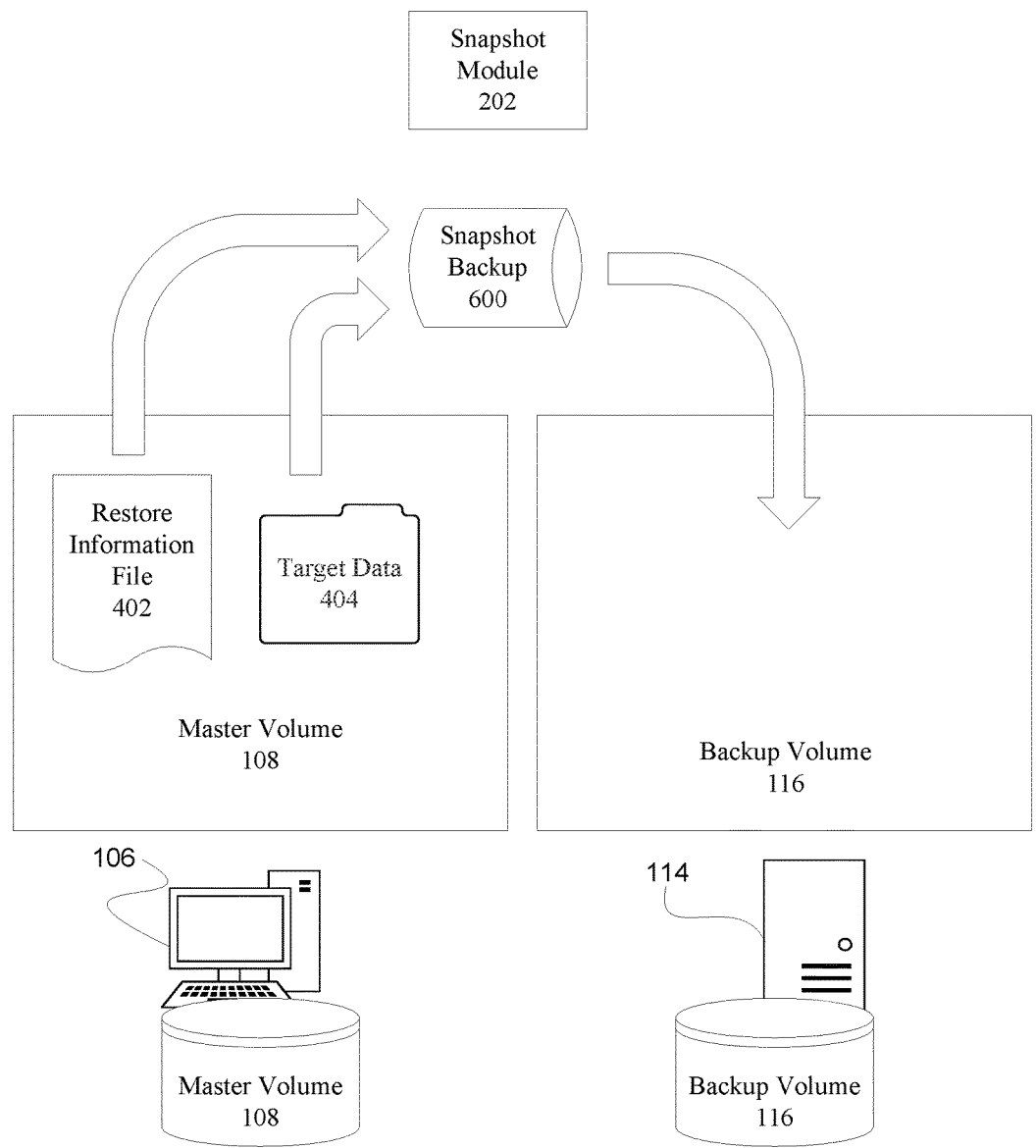
FIG. 6 is a schematic block diagram depicting some functions of the snapshot module of one embodiment of an apparatus for snapshot backup with unified restore information.

FIG. 6 depicts some functions of the snapshot module 202 of one embodiment of the apparatus 100 for snapshot backup with unified restore information.

In some embodiments, the snapshot module 202 performs a snapshot backup of the master volume 108, and stores the snapshot backup 600 on the backup volume 116 that is coupled to its corresponding system (in this example, the backup system 114). The snapshot backup 600 comprises a snapshot backup of the target data 404, as well as the restore information file 402 previously placed on the master volume 108. In this way, the information needed to restore application consistency of the target data 404 accompanies the target data 404 itself, rather than being stored separately in a different location.

By including the restore information file 402 in the snapshot backup 600 itself, the need to track and manage the restore information 400 separately is eliminated. Secondly, by including the restore information file 402 in the snapshot backup 600, flexibility is increased in that the restore client need not be specially pre-programmed with actions and information to handle different types of backups; any needed information is found in the restore information 400 stored in the restore information file 402. Thus, a new backup type is used, the restore client need only read the restore information 400 in the restore information file 402 to ascertain any needed actions or information during the restoration process. With such an arrangement, flexibility is greatly improved.

Furthermore, including the restore information file 402 in the snapshot backup 600 increase flexibility and compatibility with a wide variety of technology environments, such as different operating systems, applications and hypervisor technology.

As explained herein, in other embodiments where a different system (such as the master system 106 or the destination system 110) is additionally functioning as the backup system 114, that system will be coupled to the backup volume 116.

As described herein, the apparatus 100, in its various embodiments, may use different types of backup in its operation. The snapshot module 202 may utilize various types of backup to perform the snapshot backup, such as entire virtual machine backups, individual database backups, hardware snapshot backups, software snapshot backups, online backup mode backups, frozen application backups, and other types of backup.

Figure 7:
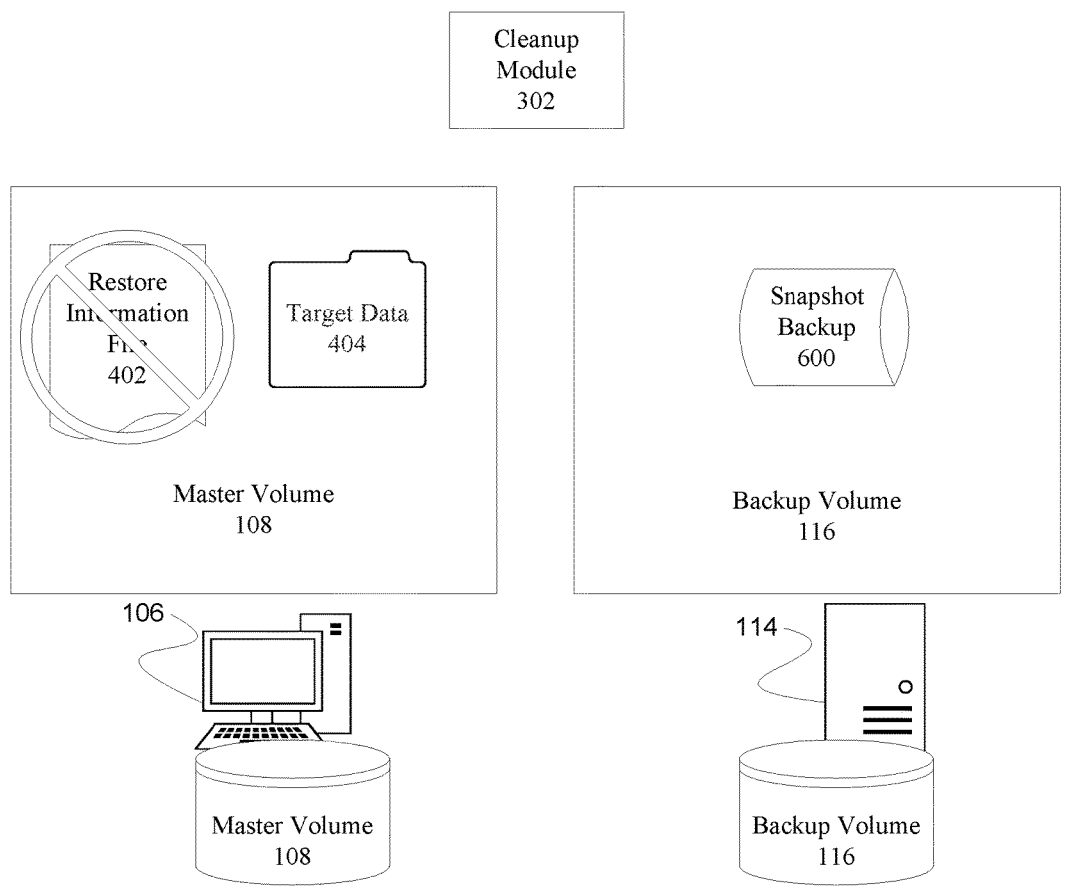
FIG. 7 is a schematic block diagram depicting some functions of the cleanup module of one embodiment of an apparatus for snapshot backup with unified restore information.

FIG. 7 depicts some functions of the cleanup module 302 of one embodiment of the apparatus 100 for snapshot backup with unified restore information. In some embodiments, the cleanup module 302 deletes the restore information file 402 from the master volume 108 after the snapshot module 202 has created the snapshot backup 600 and placed the snapshot backup 600 onto the backup volume 116. At this point, there is no need for the restore information file 402 to remain on the master volume 108, as the snapshot backup 600 has already been made, and the snapshot backup 600 already include the restore information in the restore information 400 within the restore information file 402. Deletion of the restore information file 402 conserves storage space on the volume on which the restore information file 402 is stored.

Alternatively, in some embodiments, the restore information file 402 is not deleted, and is retained on the corresponding volume. Retention of the restore information 400 and/or the self-executing script 1000 may be useful for troubleshooting, analysis, and optimization. For example, if an error occurs in the backup process and the restore information 400 or the self-executing script 1000 is retained, the restore information 400 or the self-executing script may be analyzed to help determine the cause of the error in the backup process. Furthermore, retention may also be helpful for optimizing the backup process. By analyzing the restore information 400, the backup process may be analyzed and optimized for specific systems or situations, thus improving performance of the backup process.

Figure 8:
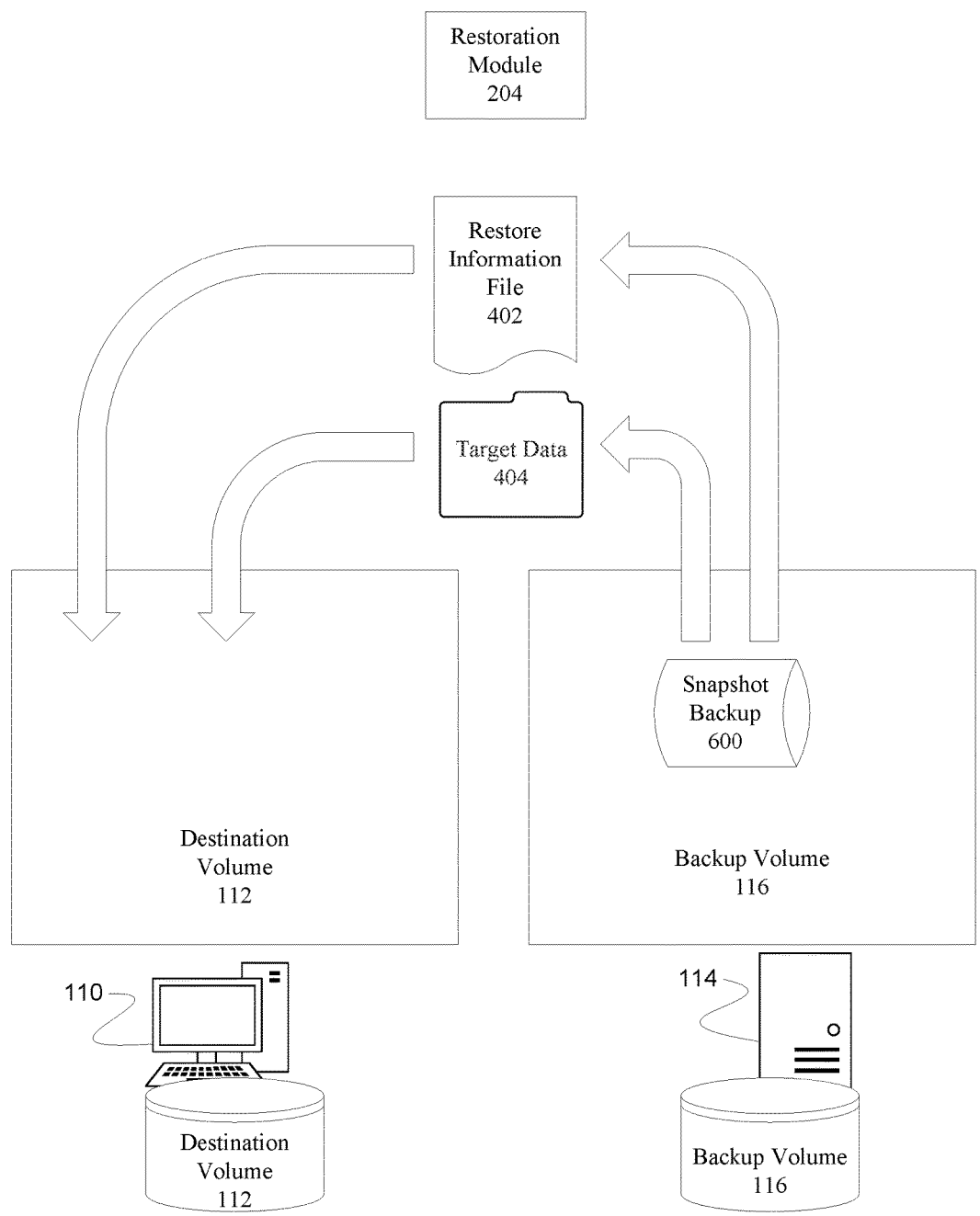
FIG. 8 is a schematic block diagram depicting some functions of the restoration module of one embodiment of an apparatus for snapshot backup with unified restore information.

FIG. 8 depicts some functions of the restoration module 204 of one embodiment of the apparatus 100 for snapshot backup with unified restore information. In some embodiments, the restoration module 204 retrieves the snapshot backup 600 from the backup volume 116, and restores the target data 404 and the restore information file 402 to the destination volume 112 from the snapshot backup 600.

In some embodiments, the cleanup module 302 may delete the snapshot backup 600 from the backup volume 116 after the target data 404 and the restore information file 402 are restored to the destination volume 112. This is done to save space on the backup volume 116, allowing for more backups to be made to the backup volume 116.

In other embodiments, however, the snapshot backup 600 may be maintained on the backup volume 116 for a certain period of time, to be used at a later time and later deleted. Yet other embodiments contemplate storing the snapshot backup 600 on the backup volume 116 for an indefinite amount of time, to provide another layer of backup redundancy. Furthermore, other applications may also access the snapshot backup 600 from the backup volume 116 uses other than strict backup of the target data 404. For example, the backup volume 116 may be a more convenient location for certain applications or users to access the target data 404, and such an arrangement may allow more convenient access to the target data 404 than accessing the target data 404 from the destination volume 112 or other location.

Figure 9:
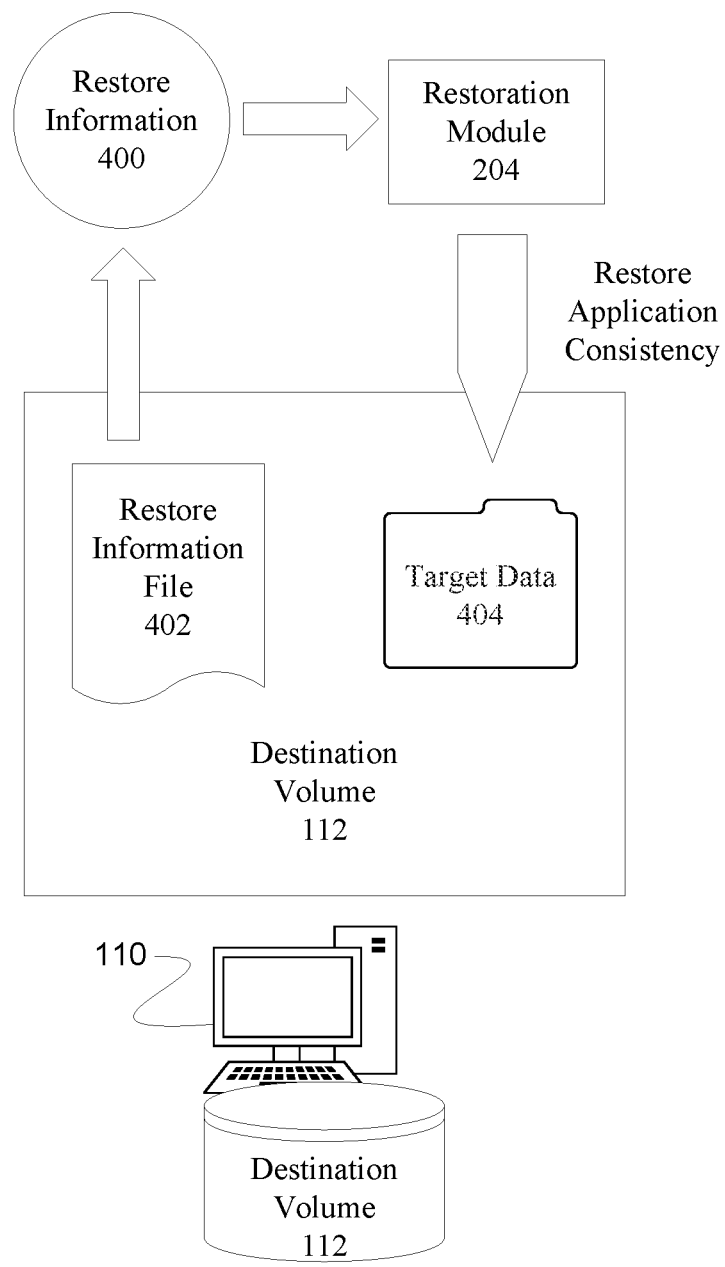
FIG. 9 is a schematic block diagram depicting some functions of the restoration module of one embodiment of an apparatus for snapshot backup with unified restore information.

FIG. 9 depicts some functions of the restoration module 204 of one embodiment of the apparatus 100 for snapshot backup with unified restore information. In some embodiments, the restoration module 204 extracts the restore information 400 from the restore information file 402, and performs actions on the target data 404 to restore application consistency of the target data 404.

The individual actions taken to restore application consistency of the target data 404 will vary, based on the backup type, the restore information 400, and characteristics of the target data 404 itself. The backup type, for example, may comprise entire virtual machine backups, individual database backups, hardware snapshot backups, software snapshot backups, online backup mode backups, frozen application backups and other types of backup. Because different types of backup perform the backup differently, different specific actions must be taken in order to restore application consistency in different situations where each backup type is used.

For example, in the case of a database restore, the restoration module 204 may replay the transaction logs and ensure that the transactions are properly written to the database file. Another example includes a file system restore, wherein the restoration module 204 may perform some checksums on the restored file system. If a checksum is missing or mismatches, the restoration module may use the journaling file system's journal to restore application consistency.

Figure 10:
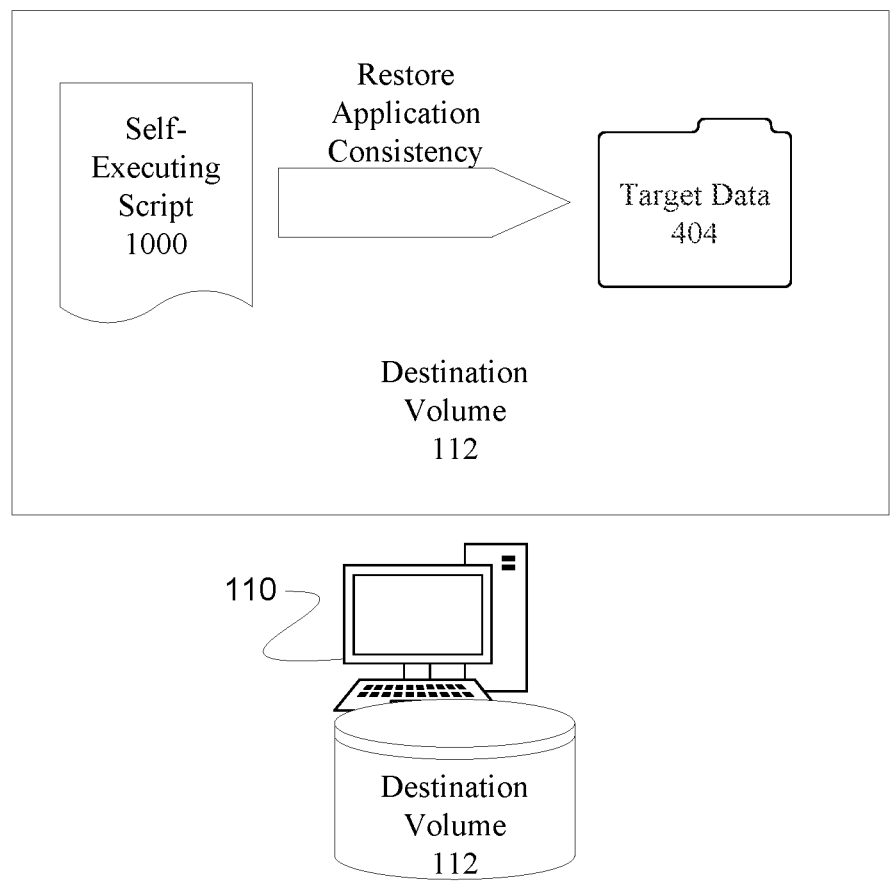
FIG. 10 is a schematic block diagram depicting some functions of the self-executing script of one embodiment of an apparatus for snapshot backup with unified restore information.

FIG. 10 depicts some functions of a self-executing script of one embodiment of the apparatus 100 for snapshot backup with unified restore information. Some embodiments use a self-executing script 1000 in place of the restore information file 402. The self-executing script 1000, upon being opened, automatically executes pre-programmed instructions of which the host system need not be aware.

In some embodiments, the information module 300 queries the master system 106 for system information 500. In some embodiments, the system information 500 comprises information about the system to which the master volume 108 is connected (in this example, the master system 106). The system information 500 comprises information about the system, such as information regarding the types of applications run on the master system 106, the operating system used on the master system 106, hypervisor software run on the master system 106, as well as other information regarding the master system 106. The possible types of information gathered are not limited to those specifically listed herein.

In some embodiments, the strategy module 200 determines the optimal backup type based on the system information 500 received from the information module 300. In some embodiments, the strategy module 200 then determines restore instructions based on the system information 500. In some embodiments, the restore instructions comprise instructions to be run to restore application consistency of the target data 404.

In some embodiments, the strategy module 200 then places the restore instructions into a self-executing script 1000 to be run after restoring the target data 404 to the destination volume 112. As the self-executing script 1000 contains the restore instructions, they can then be run in order to restore the target data 404.

In some embodiments, after the target data 404 and the self-executing script 1000 are restored to the destination volume 112, the self-executing script 1000 is run. In some embodiments, the self-executing script 1000 may be run by the destination system 110, and in other embodiments, the self-executing script 1000 may be run by another system.

Upon being run, the self-executing script 1000 executes the restore instructions contained within the self-executing script, which restore the application consistency of the target data 404. Again, the exact composition and arrangement of the instructions will vary, depending on the backup type, system information, and other factors, to best restore the target data 404 and the application consistency of the target data 404 depending on the individual situation.

The self-executing script 1000 offers more flexibility as compared to alternatives. The system that runs the self-executing script 1000 need not have been previously programmed with certain instructions regarding the restoration of the target data 404 and restoration of application consistency of the target data 404.

Also, the use of a self-executing script 1000 allows functionality beyond just unpacking the data and placing it in a restore location. A self-executing script 1000 includes and automatically executes the restore instructions that restore application consistency. Furthermore, a self-executing script 1000 allows for additional complex recovery actions to execute automatically, without any intervention needed. These additional complex recovery actions may vary depending on the additional embodiments and specific situations encountered by different embodiments.

Figure 11:
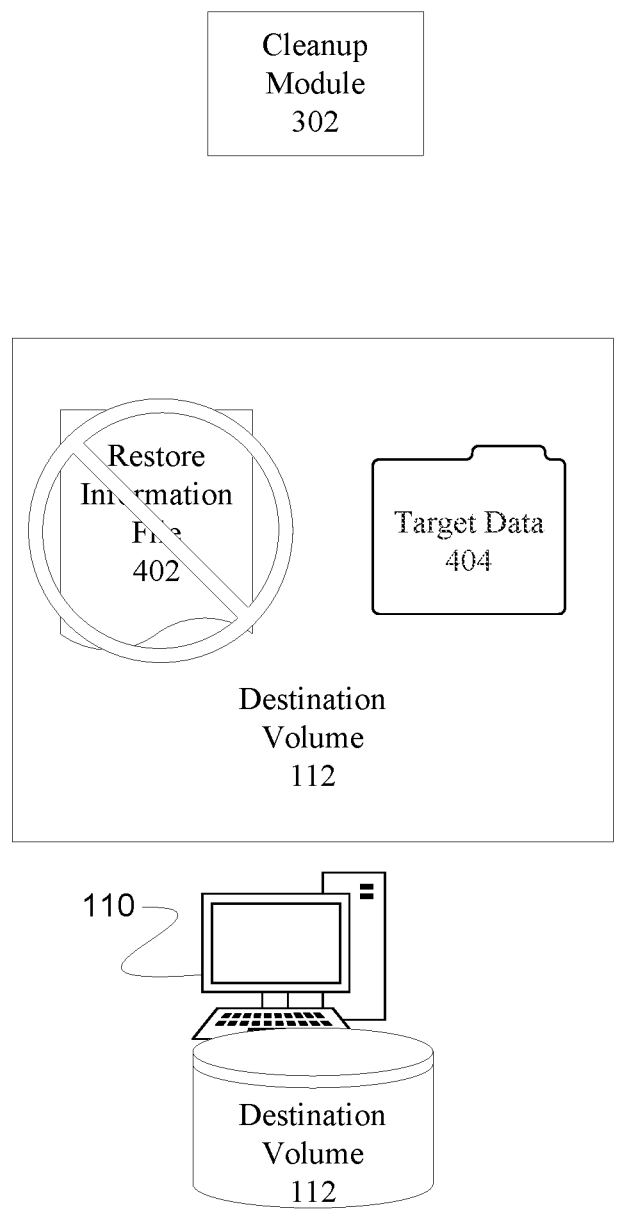
FIG. 11 is a schematic block diagram depicting some functions of the cleanup module of one embodiment of an apparatus for snapshot backup with unified restore information.

FIG. 11 depicts some functions of the cleanup module 302 of the apparatus 100 for snapshot backup with unified restore information. In some embodiments, the cleanup module 302 deletes the restore information file 402 from the destination volume 112 after application consistency of the target data 404 has been restored.

In some embodiments that utilize a self-executing script 1000 in place of a restore information file 402, the cleanup module 302 deletes the self-executing script 1000 from the destination volume 112 after application consistency of the target data 404 has been restored.

Deletion of the restore information file 402 (and in some embodiments, the self-executing script 1000) conserves storage space on the volume on which the restore information file 402 or self-executing script 1000 is stored. In some embodiments, the restore information file 402 is not deleted, and is maintained on the corresponding volume. In some embodiments, the self-executing script 1000 is not deleted, and is maintained on the corresponding volume.

Retention of the restore information 400 and/or the self-executing script 1000 is useful for troubleshooting, analysis, and optimization. For example, if an error occurs in the backup process and the restore information 400 or the self-executing script 1000 is retained, the restore information 400 or the self-executing script may be analyzed to help determine the cause of the error in the backup process.

Furthermore, retention may also be helpful for optimizing the backup process. By analyzing the restore information 400 or self-executing script 1000, the backup process may be analyzed and optimized for specific systems or situations, thus improving performance of the backup process.

Various embodiments of a method 1200 for snapshot backup with unified restore information will now be described. As the apparatus 100 and method 1200 are related, reference may be made to the description of various embodiments of the apparatus 100 to better understand some details of the method 1200.

Figure 12:
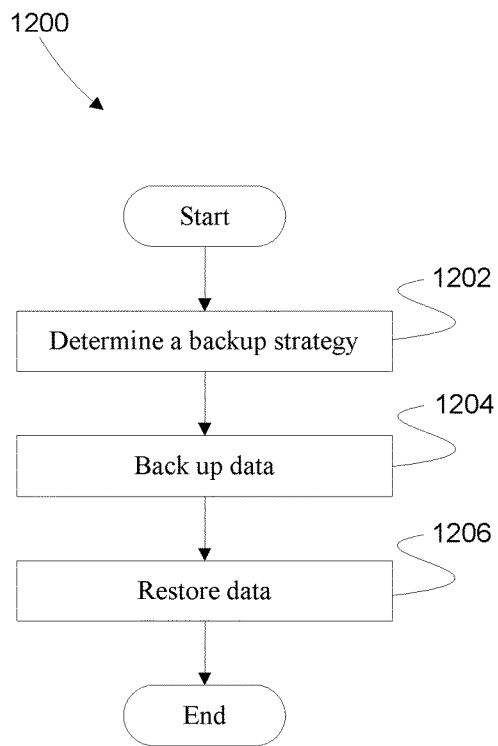
FIG. 12 is a schematic flow chart diagram illustrating one embodiment of a method for snapshot backup with unified restore information.

FIG. 12 depicts one embodiment of a method 1200 for snapshot backup with unified restore information. In some embodiments, the method 1200 comprises blocks 1202, 1204, and 1206.

In block 1202, the method 1200 may determine a backup strategy. In block 1204, the method 1200 may back up data. In block 1206, the method 1200 may restore data. More details and exemplary implementations of each of these steps will be explained in the following examples of further embodiments.

Figure 13:
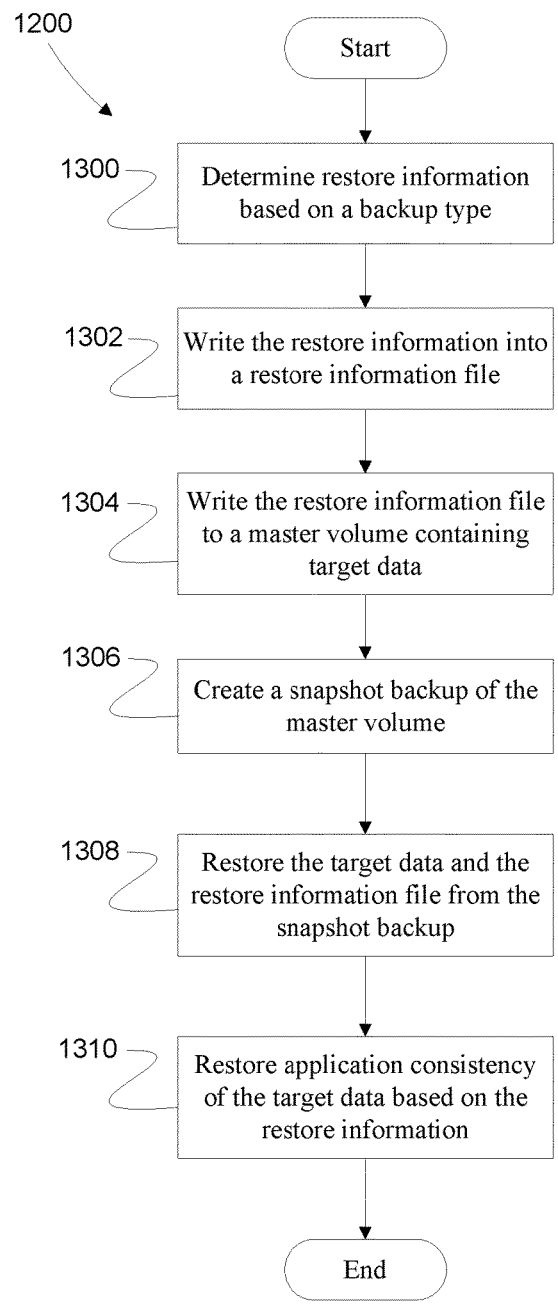
FIG. 13 is a schematic flow chart diagram illustrating one embodiment of a method for snapshot backup with unified restore information.

FIG. 13 depicts one embodiment of a method 1200 for snapshot backup with unified restore information. In some embodiments, the method 1200 comprises blocks 1300, 1302, 1304, 1306, 1308 and 1310.

In block 1300, the method may determine restore information based on a backup type. Possible backup types include entire virtual machine backups, individual database backups, hardware snapshot backups, software snapshot backups online backup mode backups, frozen application backups and other types of backup. Possible backup types used by the method 1200 are not limited to those specifically mentioned herein.

In some embodiments, the method 1200 may use only one type of backup, whereas in other embodiments, the method 1200 may use a variety of different types of backup in different situations.

Restore information may comprise information such as the restore information 400 of the apparatus 100 as described herein. In embodiments where the method 1200 may use one or more of a variety of backup types, the specific content and arrangement of the restore information may vary depending on the backup type used in a certain situation, as different backup types will require different actions and information to successfully restore data and restore application consistency of the data.

In block 1302 the method 1200 may write the restore information into a restore information file. In some embodiments, the restore information file may comprise, for example, the restore information file 402 of the apparatus 100 as described herein. The restore information file contains and packages the restore information determined in block 1300, which will be used in the method 1200 to restore data and restore application consistency of that data.

In block 1304, the method 1200 may write the restore information file to a master volume containing target data.

In some embodiments, the master volume may comprise, for example, the master volume 108 of the apparatus 100 as described herein. In other embodiments, the method 1200 may utilize multiple master volumes connected to a single system. In further embodiments, the method 1200 may utilize multiple master volumes spread across multiple systems.

In some embodiments, the master volume described in block 1304 contains the target data. The target data described in block 1304 comprises, for example, the target data 404 of the apparatus 100 as described herein, and comprises data to be backup up by the method 1200.

In some embodiments, the method 1200 may use one master volume and one set of target data, whereas in other embodiments, the method 1200 may use multiple master volumes and multiple sets of target data, in which case the target data of the method 1200 comprises the multiple sets of target data.

In block 1306, the method 1200 may create a snapshot backup of the master volume. As mentioned previously, different embodiments may utilize different types of backup, including entire virtual machine backups, individual database backups, hardware snapshot backups, software snapshot backups, online backup mode backups, frozen application backups, and other types of backup. The possible backups that may be used by the method 1200 are not limited to those specifically mentioned herein.

In some embodiments, the snapshot backup described in block 1306 may be written to a destination volume, such as the destination volume 112 of the apparatus 100 as described within. In other embodiments, the snapshot backup is written to the master volume alongside the target data, and later transferred to a destination volume. The method 1200 is not limited to the specific destinations for the snapshot backup mentioned herein.

In block 1308, the method 1200 may restore the target data and the restore information file from the snapshot backup. In some embodiments, the target data and the restore information file may be restored to a destination volume, such as, for example, the destination volume 112 of the apparatus 100. In other embodiments, the target data and the restore information file may be restored to another volume as desired.

In block 1310, the method 1200 may restore application consistency of the target data based on the restore information. As the restore information varies depending on the backup type, the specific details of restoring application consistency will vary depending on the exact situation. This flexibility is desired, as it allows the method to function with a variety of different backup types and computer systems.

It should be noted that the embodiment of the method 1200 depicted herein also includes blocks from other embodiments. For brevity, description of these blocks is not repeated. Reference may be made to the descriptions of other embodiments for description of those blocks. It should also be noted that in this example, blocks 1300, 1302 and 1304 provide an implementation of block 1202, block 1306 provides an implementation of block 1204, and blocks 1308 and 1310 provide an implementation of block 1206.

Figure 14:
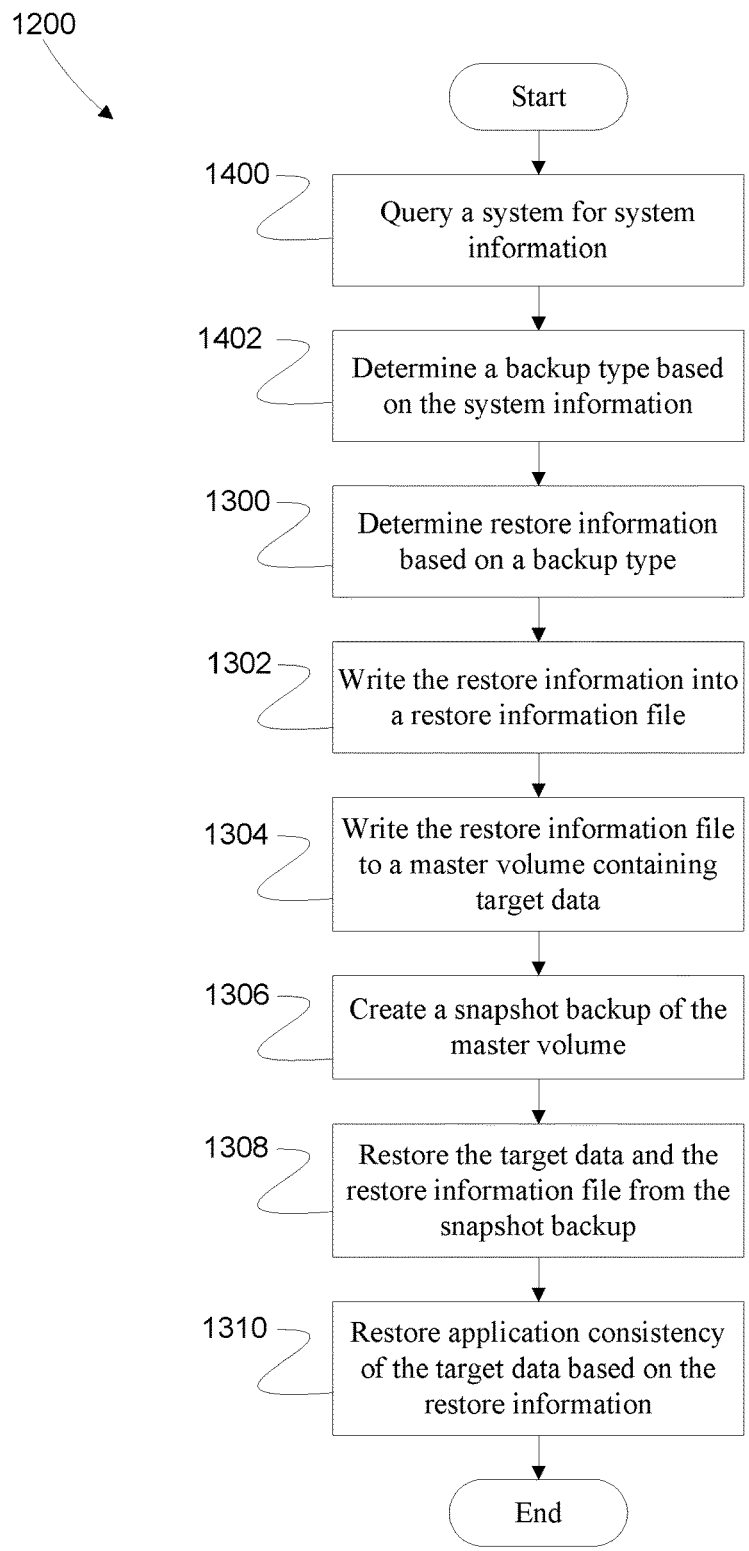
FIG. 14 is a schematic flow chart diagram illustrating one embodiment of a method for snapshot backup with unified restore information.

FIG. 14 depicts one embodiment of a method 1200 for snapshot backup with unified restore information. In some embodiments, the method 1200 comprises blocks 1400, 1402 and 1404.

In block 1400 the method 1200 may query a system for system information.

In some embodiments, the system information may comprise information about the system to which the master volume is coupled, such as information regarding the types of applications run on the system, the operating system used on the system and hypervisor software run on the system, as well as other information about the system. The possible types of information gathered are not limited to those specifically listed herein, and may vary depending on individual embodiments of the method 1200.

In block 1402 the method 1200 may determine a backup type based on the system information. As explained herein, in some embodiments the backup type may comprise entire virtual machine backups, individual database backups, hardware snapshot backups, software snapshot backups, online backup mode backups, frozen application backups and other types of backup. The backup type as determined based on the system information need not be limited to those specific backup types mentioned herein. In some embodiments, the method 1200 may also choose multiple backup types to be used. Certain situations may require or benefit from the use of multiple backup types, including those backup types listed above.

It should be noted that the embodiment of the method 1200 depicted herein also includes blocks from other embodiments. For brevity, description of these blocks is not repeated. Reference may be made to other embodiments for description of those blocks. It should also be noted that in this example blocks 1400, 1402, 1300, 1302 and 1304 provide an implementation of block 1202, block 1306 provides an implementation of block 1204, and blocks 1308 and 1310 provide an implementation of block 1206.

Figure 15:
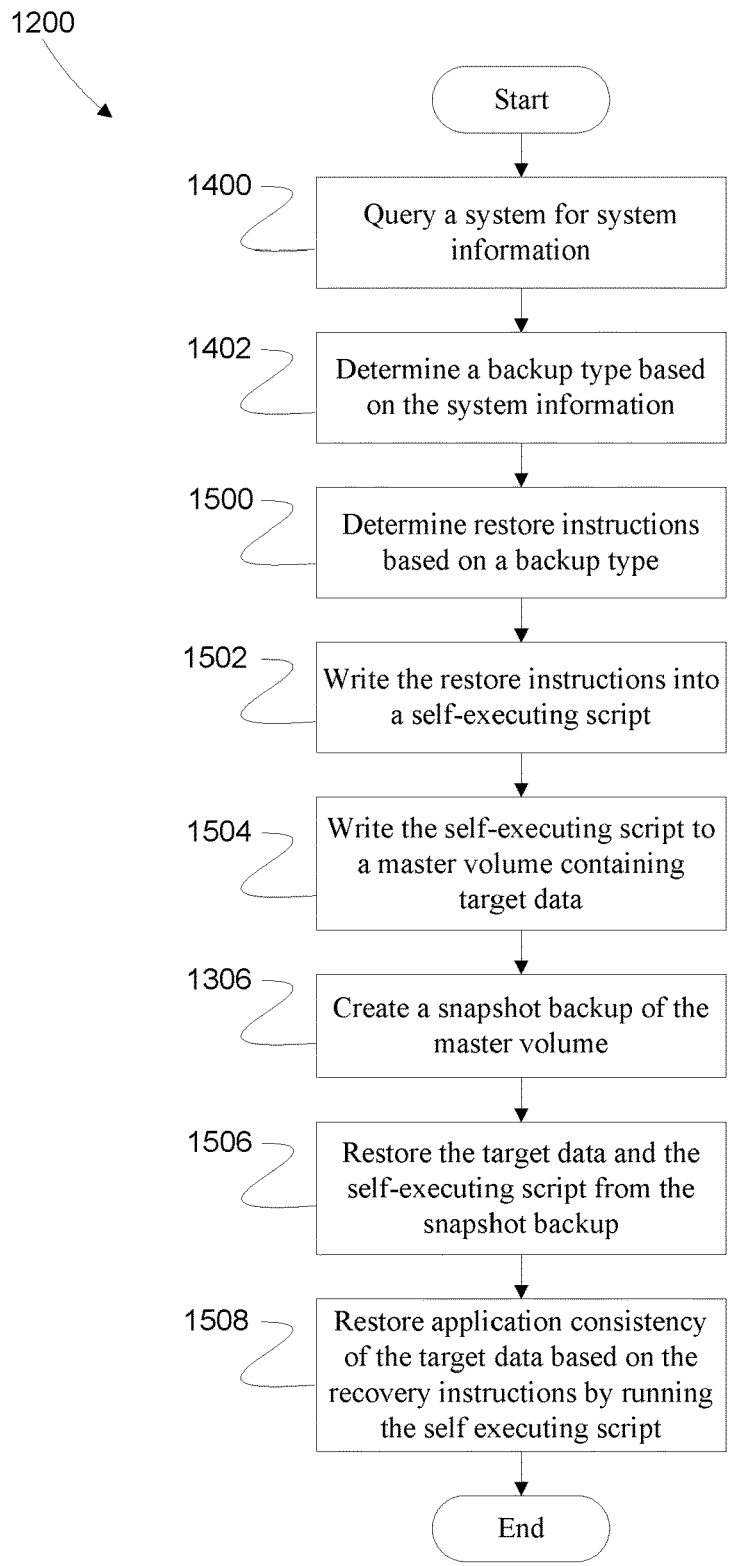
FIG. 15 is a schematic flow chart diagram illustrating one embodiment of a method for snapshot backup with unified restore information.

FIG. 15 depicts one embodiment of a method 1200 for snapshot backup with unified restore information. In this example, as well as in other embodiments, instead of creating, storing and using a restore information file, the method 1200 comprises the creation, storage and use of a self-executing script to automatically execute instructions that restore the application consistency of the target data.

In some embodiments, the method 1200 comprises blocks 1500, 1502, 1504, 1506 and 1508.

In block 1500, the method 1200 may comprise determining restore instructions based on the backup type. As discussed herein, the method 1200 may use a variety of types of backup. For each type of backup, there are corresponding restore instructions needed to properly restore the target data and restore application consistency of the target data. Thus, the restore instructions will vary, based upon the backup type used, as well as other factors. Such flexibility is desirable, which allows the method 1200 to work with a variety of different computer systems and applications.

In block 1502 the method 1200 may write the restore instructions into a self-executing script. The self-executing script comprises a file that, upon being opened, automatically executes pre-programmed instructions of which the host system need not be aware.

In block 1504 the method 1200 may write the self-executing script to a master volume containing target data. As discussed herein, the master volume may comprise one single master volume, or it may comprise multiple master volumes that may all be attached to one single master system, or spread across multiple master systems. The self-executing script is written alongside the target data.

In block 1506 the method 1200 may restore the target data and the self-executing script from the snapshot backup. The target data and the self-executing script may be restored to a destination volume, or it may be restored to the same volume from which it was obtained in block 1503. The various embodiments of the method are not limited to the specific destinations listed herein.

Depending upon the specific type of backup used, the restoration of the target data and the self-executing script may vary, as different types of backup (including those described herein) may have different requirements, limitations and procedures for restoring the target data and the self-executing script from the snapshot backup.

In block 1508 the method 1200 may restore application consistency of the target data based on the recovery instructions by running the self-executing script. The exact composition and arrangement of the instructions executed by running the self-executing script will vary, depending on the backup type, system information and other factors, to best restore the target data and restore the application consistency of the target data.

The self-executing script offers more flexibility as compared to alternatives. The system that runs the self-executing script need not have been previously programmed with instructions regarding the restoration of the target data and restoration of application consistency of the target data.

Also, the use of a self-executing script allows functionality beyond just unpacking the data and placing it in a restore location. A self-executing script includes and automatically executes the restore instructions that restore application consistency. Furthermore, a self-executing script allows for additional complex recovery actions to execute automatically, without any intervention needed. These additional complex recovery actions may vary depending on the additional embodiments and specific situations encountered by different embodiments It should be noted that the embodiment of the method 1200 depicted herein also includes blocks from other embodiments. For brevity, description of these blocks is not repeated. Reference may be made to the descriptions of other embodiments for description of those blocks. It should also be noted that in this example blocks 1400, 1402, 1500, 1502 and 1504 provide an implementation of block 1202, block 1306 provides an implementation of block 1204, and blocks 1506 and 1508 provide an implementation of block 1206.

Figure 16:
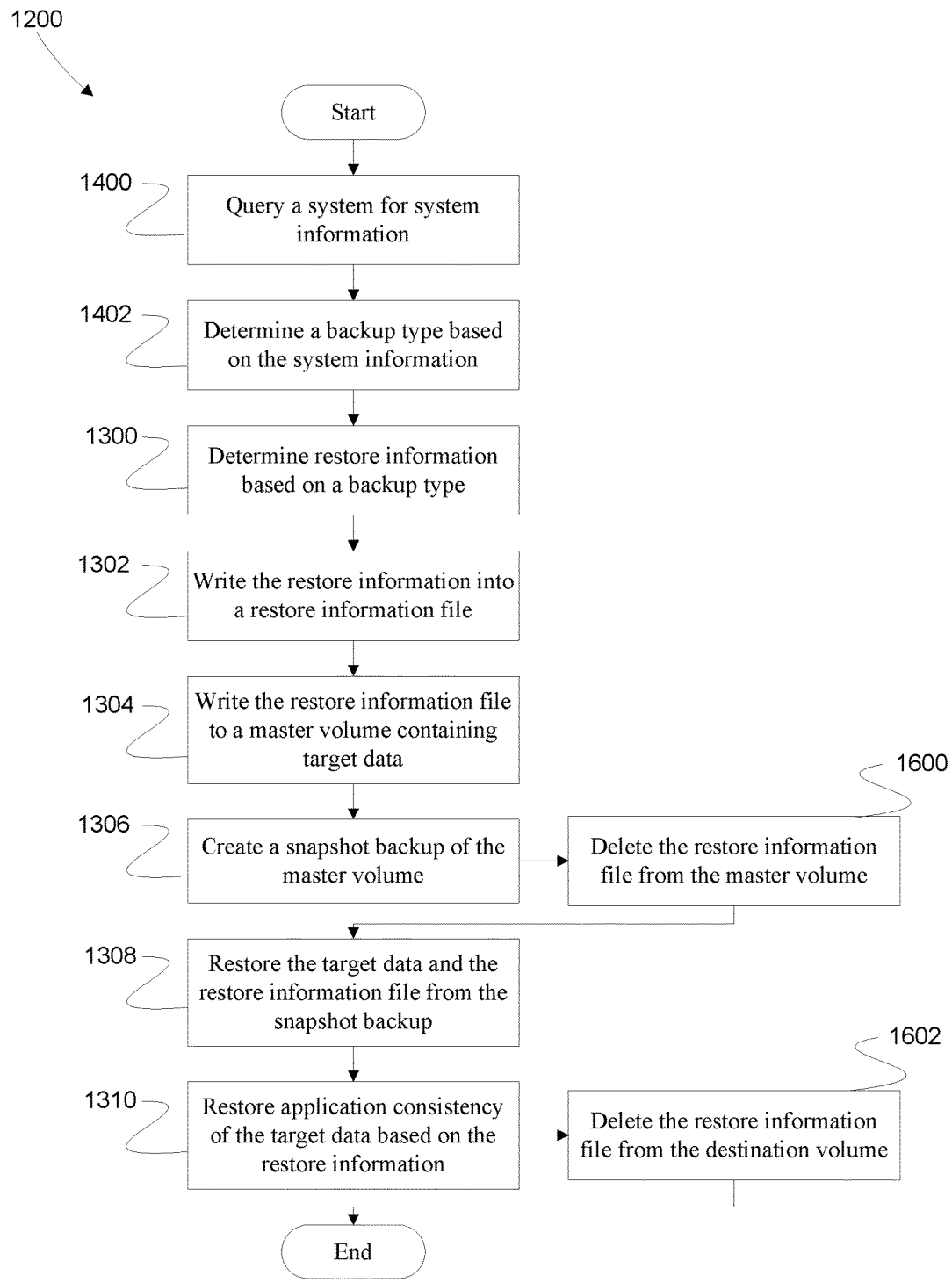
FIG. 16 is a schematic flow chart diagram illustrating one embodiment of a method for snapshot backup with unified restore information.

FIG. 16 depicts one embodiment of a method 1200 for snapshot backup with unified restore information. In some embodiments, the method 1200 comprises blocks 1600 and 1602.

In block 1600 the method 1200 may delete the restore information file from the master volume. In block 1602 the method 1200 may delete the restore information file from the destination volume.

In some of those embodiments that include the self-executing script, the self-executing script may be deleted from the master volume and the destination volume, similar to blocks 1600 and 1602 wherein the restore information file is deleted from the master volume and the destination volume.

Deletion of the restore information file (and in some embodiments, the self-executing script) conserves storage space on the volume on which the restore information file or self-executing script is stored. In some embodiments, the restore information file is not deleted, and is maintained on the corresponding volume. In some embodiments, the self-executing script is not deleted, and is maintained on the corresponding volume.

Retention of the restore information and/or the self-executing script is useful for troubleshooting, analysis, and optimization. For example, if an error occurs in the backup process and the restore information or the self-executing script is retained, the restore information or the self-executing script may be analyzed to help determine the cause of the error in the backup process.

Furthermore, retention may also be helpful for optimizing the backup process. By analyzing the restore information or self-executing script, the backup process may be analyzed and optimized for specific systems or situations, thus improving performance of the backup process.

It should be noted that the embodiment of the method 1200 depicted herein also includes blocks from other embodiments. For brevity, description of these blocks is not repeated. Reference may be made to the descriptions of other embodiments for description of those blocks. It should also be noted that in this example blocks 1400, 1402, 1300, 1302 and 1304 provide an implementation of block 1202, blocks 1306 and 1600 provide an implementation of block 1204, and blocks 1308, 1310 and 1602 provide an implementation of block 1206.

The embodiments may be practiced in other specific forms. The described embodiments are to be considered in all respects only as illustrative and not restrictive. The scope of the embodiments is, therefore, indicated by the appended claims rather than by the foregoing description. All changes which come within the meaning and range of equivalency of the claims are to be embraced within their scope.

What is claimed is:

1. An apparatus comprising:
   a strategy module that
     determines restore information based upon a backup type,
     writes the restore information into a restore information file, and
     writes the restore information file to a master volume containing target data;
   a snapshot module that creates a snapshot backup of the master volume; and
   a restoration module that
     restores the target data and the restore information file from the snapshot backup to a destination volume, and
     restores application consistency of the target data based on the restore information;
   wherein at least a portion of the information module, the backup module and the restoration module comprise one or more of hardware and executable code, the executable code stored on one or more computer readable storage media.

2. The apparatus of claim 1, further comprising
   an information module that
     queries a system for system information;
   wherein the strategy module determines the backup type based on the system information.

3. The apparatus of claim 2, wherein
   the system information comprises
     information identifying a type of application used,
     information identifying a type of operating system used, and
     information identifying a type of hypervisor software used.

4. The apparatus of claim 1, wherein
   the restore information comprises information about the system, the backup type and the target data needed to restore application consistency of the target data.

5. The apparatus of claim 1, wherein
   the restore information comprises recovery instructions.

6. The apparatus of claim 5, wherein
   the restore information file comprises a self-executing script that executes the recovery instructions.

7. The apparatus of claim 6, wherein
   the restoration module restores application consistency of the target data based on the restore information by running the self-executing script.

8. The apparatus of claim 1, further comprising
   a cleanup module that deletes the restore information file from the master volume after creating the snapshot backup of the master volume.

9. The apparatus of claim 1, further comprising
   a cleanup module that deletes the restore information file from the destination volume after restoring application consistency of the target data.

10. A method for backup and restoration of data, comprising:
    determining restore information based on a backup type,
    writing the restore information into a restore information file,
    writing the restore information file to a master volume containing target data;
    backing up data by creating a snapshot backup of the master volume;
    restoring the target data and the restore information file from the snapshot backup to a destination volume, and
    restoring application consistency of the target data based on the restore information.

11. The method of claim 10, further comprising
    querying a system for system information; and
    determining a backup type based on the system information.

12. The method of claim 11, wherein
    the system information comprises
      information identifying a type of application used,
      information identifying a type of operating system used, and
      information identifying a type of hypervisor software used.

13. The method of claim 10, wherein
    the restore information comprises information about the system, the backup type and the target data needed to restore application consistency of the target data.

14. The method of claim 10, wherein
    the restore information comprises recovery instructions.

15. The method of claim 14, wherein
    the restore information file comprises a self-executing script that executes the recovery instructions.

16. The method of claim 15, wherein
    restoring application consistency of the target data based on the restore information comprises running the self-executing script.

17. The method of claim 10, wherein backing up data further comprises
    deleting the restore information file from the master volume after creating the snapshot backup of the master volume.

18. The method of claim 10, wherein restoring data further comprises
    deleting the restore information file from the destination volume after restoring application consistency of the target data.

19. A computer program product comprising a computer readable storage medium that stores code executable by a processor, the executable code comprising code to perform
- determining restore information based on a backup type;
- writing the restore information into a restore information file on a master volume containing target data;
- backing up data by creating a snapshot backup of the master volume, wherein the snapshot backup comprises the target data and the restore information file;
- restoring the target data and the restore information file from the snapshot backup; and
- restoring application consistency of the target data based on the restore information.

20. The computer program product of claim 19, wherein the restore information comprises recovery instructions, the restore information file comprises a self-executing script; and
- restoring application consistency of the target data based on the restore information comprises running the self-executing script.

* * * * *